(12) United States Patent
Matsushima

(10) Patent No.: US 9,531,895 B2
(45) Date of Patent: Dec. 27, 2016

(54) MULTI-FUNCTION DEVICE WITH IMAGE SCANNING UNIT AND GRIP PORTION

(71) Applicant: Ryoichi Matsushima, Nagoya (JP)

(72) Inventor: Ryoichi Matsushima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 28 days.

(21) Appl. No.: 13/630,885

(22) Filed: Sep. 28, 2012

(65) Prior Publication Data
US 2013/0128295 A1    May 23, 2013

(30) Foreign Application Priority Data

Nov. 22, 2011 (JP) ................. 2011-254487

(51) Int. Cl.
*G06F 3/12* (2006.01)
*H04N 1/00* (2006.01)

(52) U.S. Cl.
CPC ...... *H04N 1/00559* (2013.01); *H04N 1/00527* (2013.01); *H04N 2201/0094* (2013.01); *H04N 2201/0096* (2013.01)

(58) Field of Classification Search
USPC ................................. 358/1.13–1.18
See application file for complete search history.

(56) References Cited

U.S. PATENT DOCUMENTS

| D501,667 S | 2/2005 | Ishigami et al. |
| D502,732 S | 3/2005 | Ishigami |
| 2004/0062579 A1 | 4/2004 | Iwago et al. |
| 2004/0062583 A1 | 4/2004 | Kameyama et al. |
| 2004/0130732 A1 | 7/2004 | Denpo |
| 2004/0253018 A1* | 12/2004 | Mui et al. ...................... 399/110 |
| 2007/0058219 A1* | 3/2007 | Yamaguchi .................. 358/497 |
| 2007/0071492 A1* | 3/2007 | Ito ................................ 399/107 |

FOREIGN PATENT DOCUMENTS

| CN | 101031018 A | 9/2007 |
| CN | 101458473 A | 6/2009 |

(Continued)

OTHER PUBLICATIONS

Office Action received in corresponding Chinese Application No. 201210376957.7, dated Nov. 4, 2014.

(Continued)

*Primary Examiner* — Marivelisse Santiago Cordero
*Assistant Examiner* — Kevin Ky
(74) *Attorney, Agent, or Firm* — Banner & Witcoff, Ltd.

(57) ABSTRACT

According to aspects of the invention, there is provided a multi-function device, which is provided with a housing, an image forming unit accommodated in the housing, and an image scanning unit arranged above the housing. The housing includes a frame supporting the image forming unit, the image scanning unit being secured to the frame and an outer cover attached to outside the frame to form a side wall of the housing. The continuous surfaces extending in an up-and-down direction are defined by at least part of side walls of the image scanning unit and at least part of the outer cover, and first grip portions having first grip faces, which extend from the continuous surfaces toward inside of the image scanning unit, are provided on the side walls of the image scanning unit.

8 Claims, 10 Drawing Sheets

(56) References Cited

FOREIGN PATENT DOCUMENTS

| JP | H05323695 A | 12/1993 |
| JP | 11-127293 | 5/1999 |
| JP | 2001-071586 | 3/2001 |
| JP | 2004-212494 | 7/2004 |
| JP | 2006-013771 | 1/2006 |
| JP | 2007083672 A | 4/2007 |
| JP | 2007-254066 A | 10/2007 |
| JP | 2009-271464 A | 11/2009 |

OTHER PUBLICATIONS

Jan. 27, 2015—(JP) Notification of Reasons of Rejection—App 2011-254487.

* cited by examiner

MULTI-FUNCTION DEVICE WITH IMAGE SCANNING UNIT AND GRIP PORTION

CROSS-REFERENCE TO RELATED APPLICATION

This application claims priority under 35 U.S.C. §119 from Japanese Patent Application No. 2011-254487 filed on Nov. 22, 2011. The entire subject matter of the application is incorporated herein by reference.

BACKGROUND

Technical Field

Aspects of the present invention relate to an MFD (Multi-Function Device).

Conventional Art

An example of a conventional MFD includes a housing, an image forming unit which is accommodated in the housing and configured to form an image on a printing medium, and an image scanning unit provided above the housing and configured to scan an image on an original sheet.

The housing has a frame, which supports the image forming unit, and the image scanning unit is secured to the frame at an upper portion thereof. The housing further includes an outer cover which is attached on an outer side of the housing and forms side walls of the housing. Handy-grip portions are provided making use of an inclined surface of the outer cover.

When the conventional MFD is moved to another place, user can grasp the grip portions to lift up the MFD.

SUMMARY

According to the above-described conventional MFD, however, when the user lifts up the MFD with gripping the grip portions of the outer cover, the weight of the image forming unit and the image scanning unit is applied to the grip portions of the outer cover. Therefore, the outer cover is required to have relatively high rigidity. However, the outer cover is a last part of an assembling procedure. Therefore, the outer cover may not be stably attached, and thus, in the conventional MFD as above there has been a problem that the outer cover tends to deform when lifted by a user.

On consideration of the above, aspects of the invention provide an MFD which is configured such that deformation of the outer cover when the user lifts the MFD can be suppressed.

According to aspects of the invention, there is provided a multi-function device, which is provided with a housing, an image forming unit accommodated in the housing and configured to form an image on a printing sheet, and an image scanning unit arranged above the housing and configured to scan an image on an original sheet. The image scanning unit has side walls. The housing includes a frame supporting the image forming unit, the image scanning unit being secured to the frame and an outer cover attached to outside the frame to from a side wall of the housing. The continuous surfaces extend in an up-and-down direction is formed by at least part of the side walls of image scanning unit and at least part of the outer cover, and first grip portions having first grip faces, which extend from the continuous surfaces toward inside of the image scanning unit, are provided on the side walls of the image scanning unit.

According to the MFD, by griping the gripping faces provided to the side walls, a user can lift the MFD. In this case, the weight of the MFD is directly loaded to the first grip faces. In this case, the weight of the image scanning unit is directly loaded to the first grip portions. Further, since the image scanning unit is fixed to the frame, the weight of the image forming unit is indirectly loaded to the first grip portions via the frame. Therefore, the weight of the image forming unit and the image scanning unit will be hardly loaded to the outer cover.

Therefore, in the MFD according to the embodiment, it is possible to suppress deformation of the outer cover when the MFD is lifted. Further, according to the above configuration, it is not necessary to make the outer cover have high rigidity, and thus design freedom for the outer cover can be increased.

BRIEF DESCRIPTION OF THE ACCOMPANYING DRAWINGS

DETAILED DESCRIPTION OF EMBODIMENT

Hereinafter, an embodiment according to aspects of the invention will be described with reference to the accompanying drawings.

Figure 1:
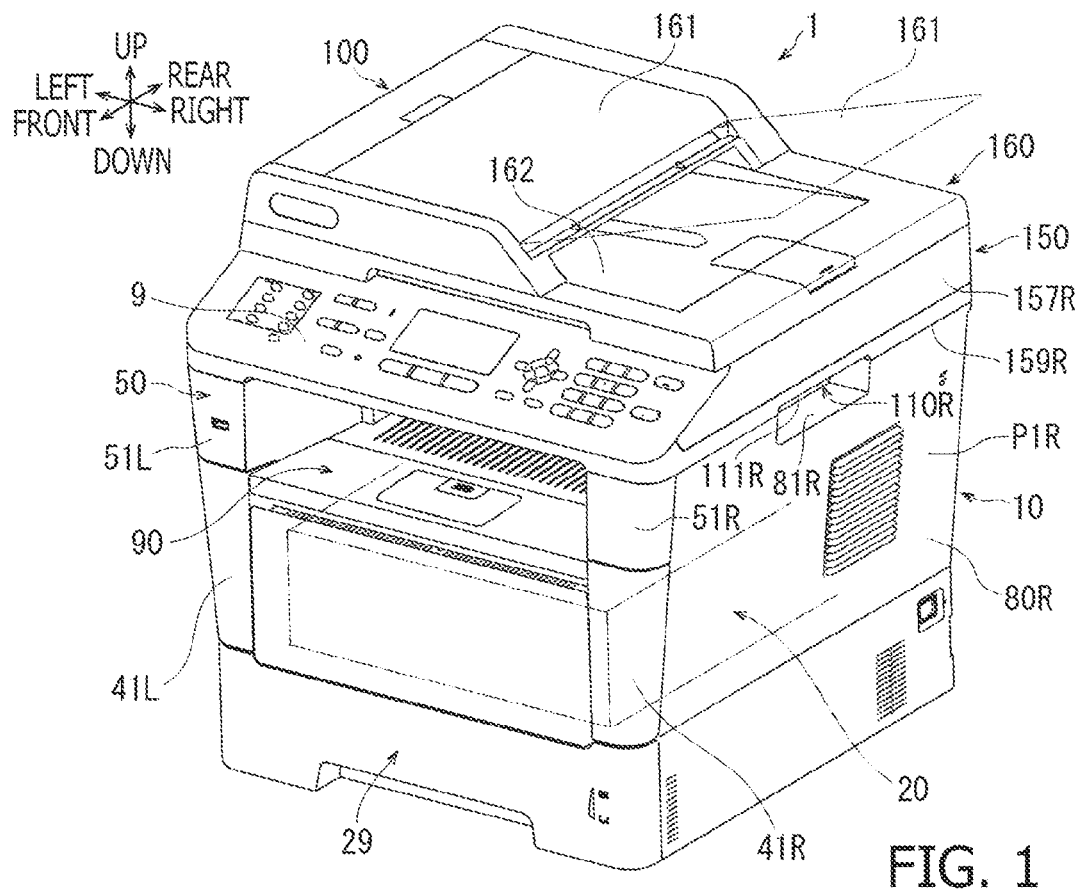
FIG. 1 is a perspective view of an MFD (Multi-Function Device) according to aspects of the invention.

An MFD 1 according to aspects of the present invention is capable of executing a plurality of processes including an image forming process and an image scanning process. In FIG. 1, a side where an operation panel 9 is provided is defined as a front side of the MFD 1, and a left-hand side of the MFD 1 when a user faces the operation unit 9 is defined as a left side of the MFD 1. The other directions are defined based on the above definition. In other drawings, the directions are indicated based on the definition above.

Overall Configuration of MFD

Figure 2:
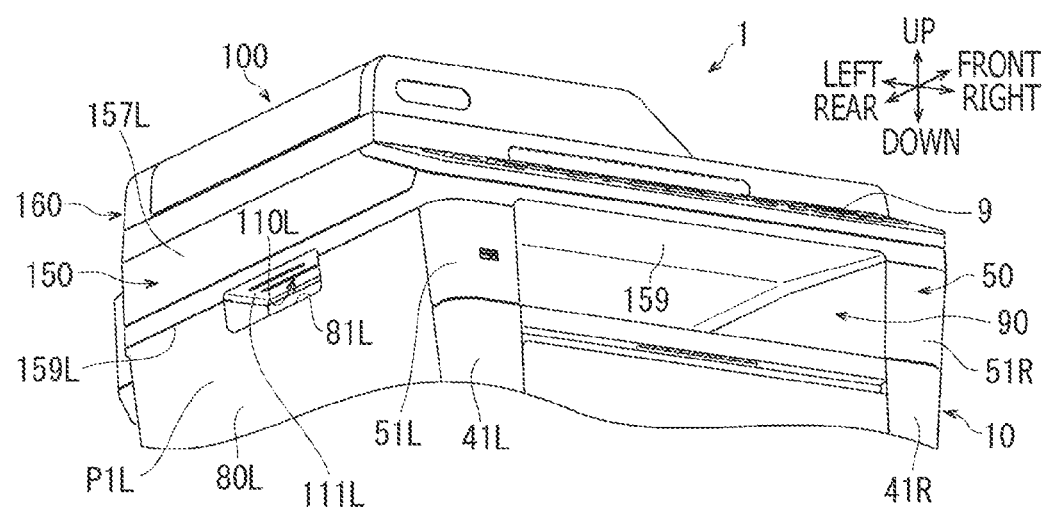
FIG. 2 is a partial perspective view of the MFD shown in FIG. 1.
Figure 3:
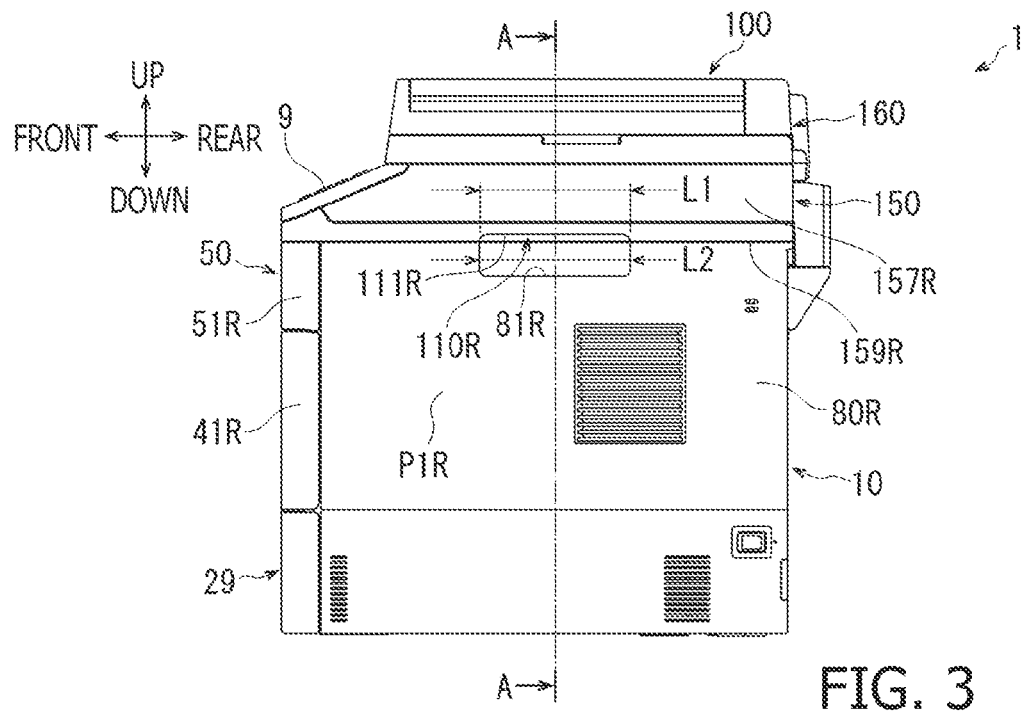
FIG. 3 is a side view of the MFD shown in FIG. 1.

The MFD 1 is provided with a housing 10, an image forming unit 20 accommodated in the housing 10, and an image scanning unit 100 provided above the housing 10 (FIGS. 1-3).

At a lower portion of the housing 10, below the image forming unit 20, a sheet cassette 29 is detachably provided. The sheet cassette 29 is configured to accommodate a plurality of sheets, on which images are formed, in a stacked state.

The image forming unit 20 is one having a well-know configuration and detailed description will be omitted for brevity. The image forming unit 20 may be an electrophotographic printer or an inkjet printer, which is configured to form a printing sheet that is fed from the stack of sheets accommodated in the sheet cassette 29 one by one.

Between the housing 10 and the image scanning unit 100, a sheet discharging space 90 is defined. The sheet discharging space 90 is an inner space having a shape of right-angled parallelepiped having an opening toward the front side of the MFD 1 and recessed rearward. An opening width of the discharging space 90, that is a length in the right-and-left direction of the sheet discharging space 90 is designed to be larger than the width of the sheets accommodated in the sheet cassette 29. A sheet on which an image is formed by the image forming unit 20 is fed to make U-turn from the rear end of the image forming unit 20 and discharged to the sheet discharge space 90. An opening height of the discharging space 90, that is a length of the opening in the up-and-down direction of the opening is designed to be sufficiently large so that the user can insert a hand therefrom to pull out the discharged sheet easily. It is noted that, according to the exemplary embodiment, the right-and-left direction of the MFD 1 is a width direction of the MFD 1.

The image forming unit 100 is of a well-known configuration and a detailed description thereof will be omitted for brevity. The image forming unit 100 includes a scanner main body 150 and an openable/closable unit 160 provided above the scanner main body 150.

On an upper surface of the scanner main body 150, a platen glass (not shown) is provided. The platen glass has a sufficient size so that an A4 size (210 mm×297 mm) original sheet can be placed thereon and scanned. In the scanner main body 150, below the platen glass, an image scanning sensor (not shown) extending in the front-and-rear direction is arranged. The image scanning sensor is configured to be reciprocally slidable between the left side end and the right side end of the platen glass.

The rear end portion of the openable/closable unit 160 is rotatably supported at the rear end portion of the scanner main body 150. When the front end portion of the openable/closable unit 160 is lifted, the platen glass provided on the upper surface of the scanner main body 150 can be exposed to outside. When the front end portion is put down, the openable/closable unit 160 covers the upper surface of the platen glass so as to urge an original sheet placed on the platen glass toward the platen glass. In this state, the image scanning unit 100 slides the image scanning sensor which extends in the front-and-rear direction (i.e., a main scanning direction) in the right-and-left direction (i.e., in an auxiliary scanning direction) to scan a two-dimensional image of the original sheet.

As shown in FIG. 1, the openable/closable unit 160 includes a sheet supply tray 161 and a sheet discharge tray 162. The openable/closable unit 160 is also provided with a not-shown ASF (automatic sheet feeder). The sheet feed tray 161 is can be rotated to extend to a position indicated by two-dotted lines in FIG. 1, and a plurality of original sheets are placed. Then, the image scanning unit 100 feeds the original sheets placed on the sheet supply tray 161 one by one with the ASF so that each original sheet passes a position above the image scanning sensor which is located at a fixed scanning position defined below the platen glass. The image scanning unit 100 causes the image scanning sensor to scan an image of the sheet passing above the image scanning sensor, and then causes the ASF to discharge the original sheet onto the sheet discharge tray 162.

Figure 4:
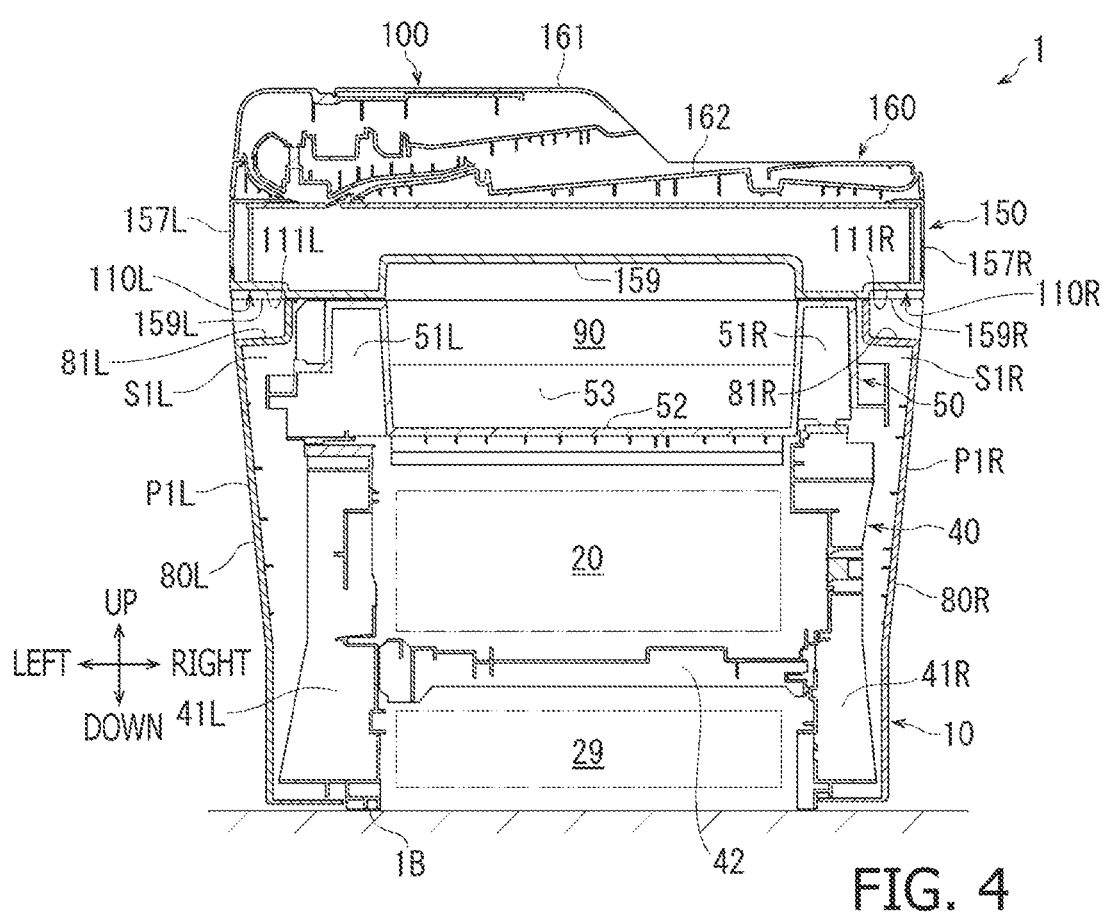
FIG. 4 is a cross-sectional view, taken along line A-A in FIG. 3, of the MFD shown in FIG. 1.
Figure 5:
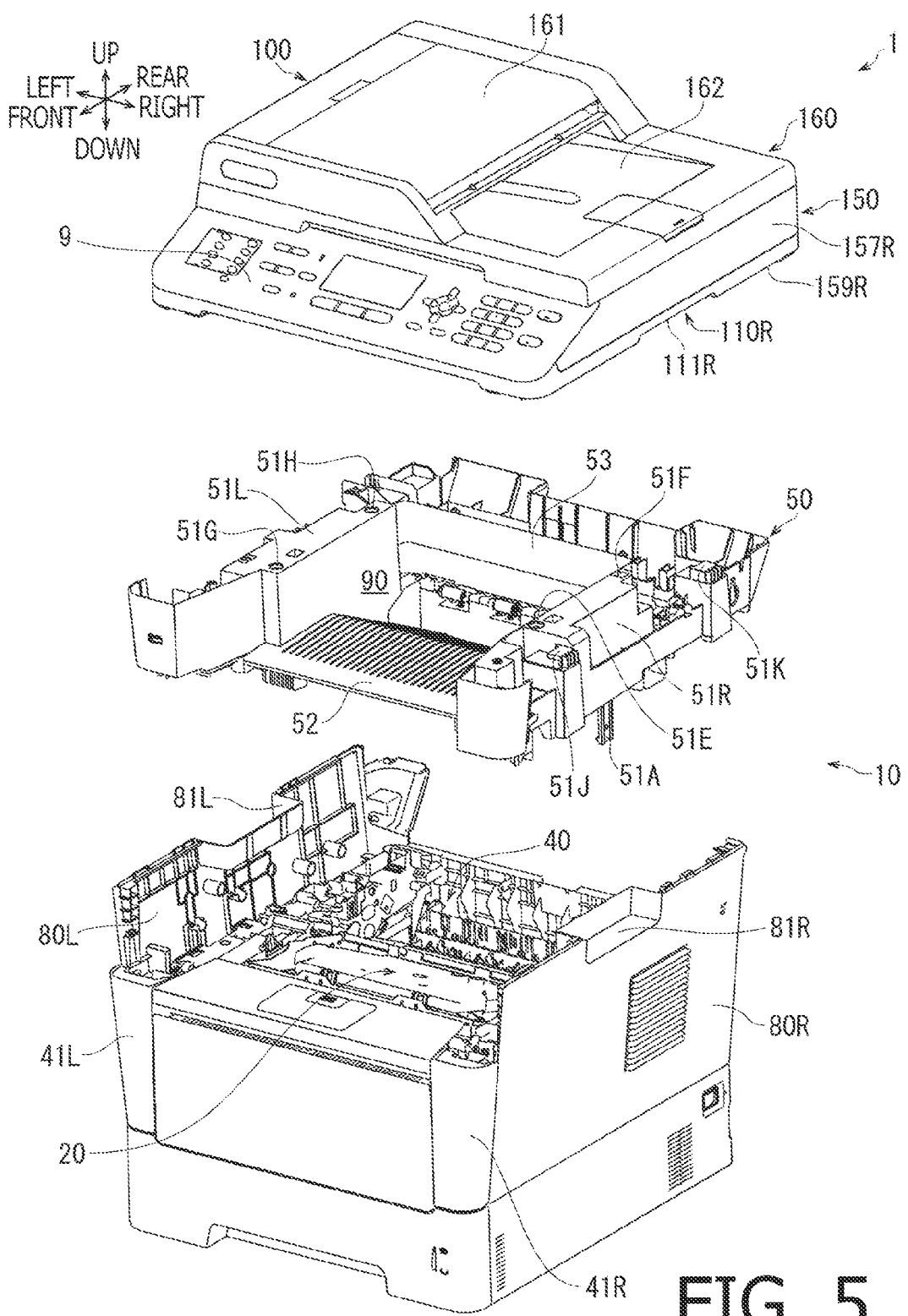
FIG. 5 is an exploded perspective view of the MFD shown in FIG. 1.

The front end portion of the scanner main body 150 is protruded forward with respect to the openable/closable unit 160, and an operation panel 9 is provided on the upper surface of the protruded portion. The user can cause the image forming unit 10 to executed an image forming process and/or the image scanning unit 100 to execute an image scanning process, by inputting commands through the operation panel 9. Further, the user can obtain an operation status of the MFD 1 based on information displayed on the operation panel 9. As shown in FIGS. 4 and 5, the housing 10 includes the frame and side covers 80R and 80L.

Frame

As shown in FIG. 4, the frame includes a main frame 40 and a joint cover 50. The main frame 40 includes a pair of side frames 41R and 41L, and a connecting member 42. The side frames 41R and 41L are plate-like resin members provided with a plurality of ribs, and each extends in the up-and-down direction and the front-and-rear direction. The bottom surfaces of the side frames 41R and 41L extend to a surface on which the MFD 1 is placed and defines lower ends 1B of the MFD 1 (see FIG. 4). Upper surfaces of the side frames 41R and 41L extend to a level substantially the same as the bottom surface of the discharging space 90. The side frames 41R and 41L face each other, in the right-and-left direction, with the image forming unit 20 and the sheet cassette 29 located therebetween, and supports the image forming unit 20 and the sheet cassette 29. As shown in FIG. 5, the front surfaces of the side frames 41R and 41L are exposed outside on the front surface of the MFD 1 and form a part of a front wall of the MFD 1.

The connecting member 42 extends horizontally between the image forming unit 20 and the sheet cassette 29 and connects the side frames 41R and 41L. It is noted that, although not shown in the drawings, the main frame 40 has a reinforcing member which also connects the side frames 41R and 41L besides the connecting member 42.

Figure 6:
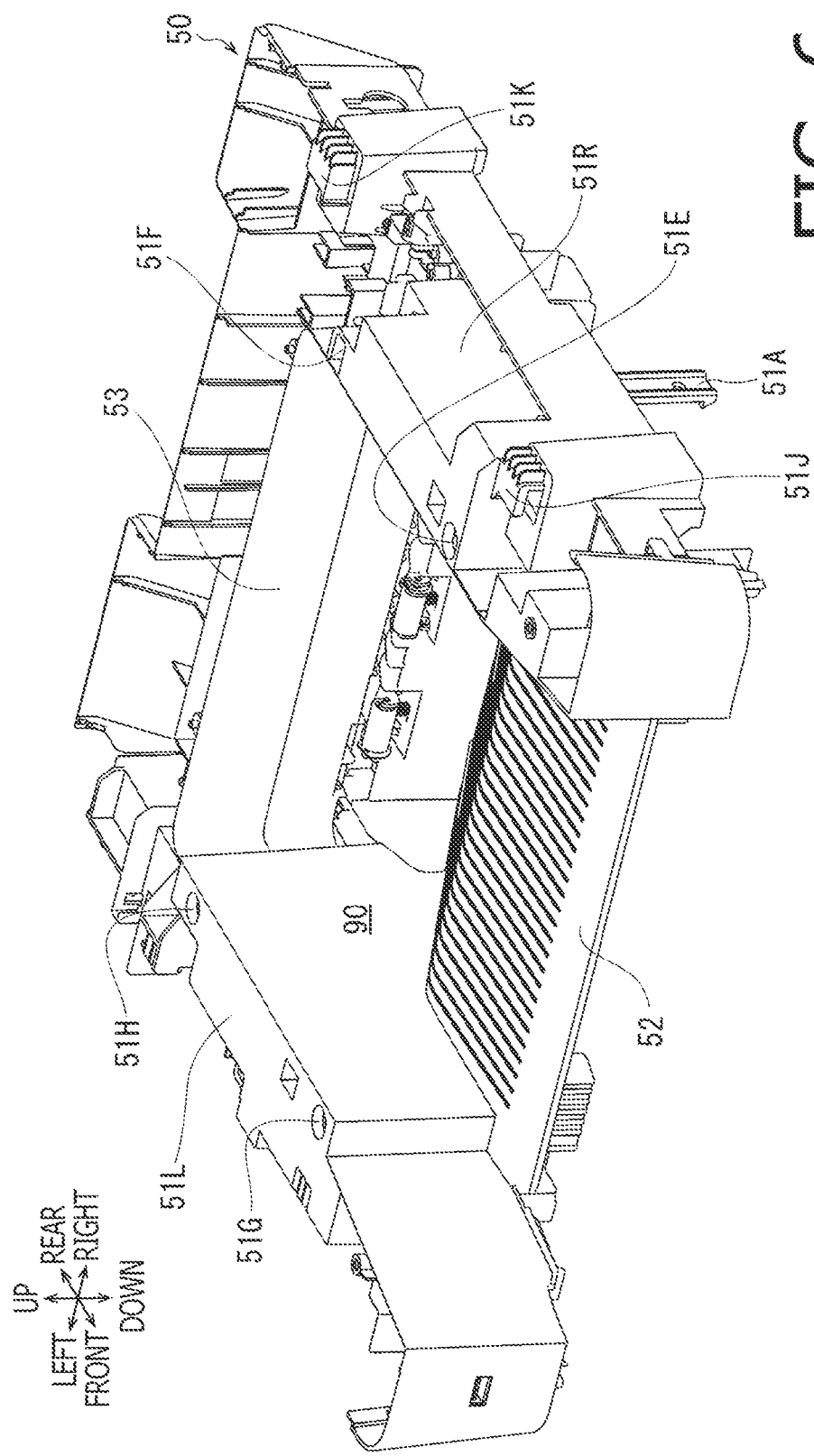
FIG. 6 is a perspective view of a joint cover, which is a part of a frame, according to aspects of the invention.

As shown in FIGS. 4 to 6, the joint cover 50 is a frame member made of resin and is configured to include integrally-molded pair of joint units 51R and 51L, the discharge tray 52 and the connecting unit 53. The joint units 51R and 51L are spaced in the right-and-left direction and face each other. The discharge space 90 is defined between the joint units 51R and 51L. The discharge tray 52 is a planar plate-like member and arranged toward front side from the connection unit 53, and connects the joint units 51R and 51L. The discharge tray 52 defines the bottom surface of the discharging space 90. The connection unit 53 is a frame extending in the right-and-left direction and connects the joint units 51R and 51L at a rear side thereof.

Figure 7:
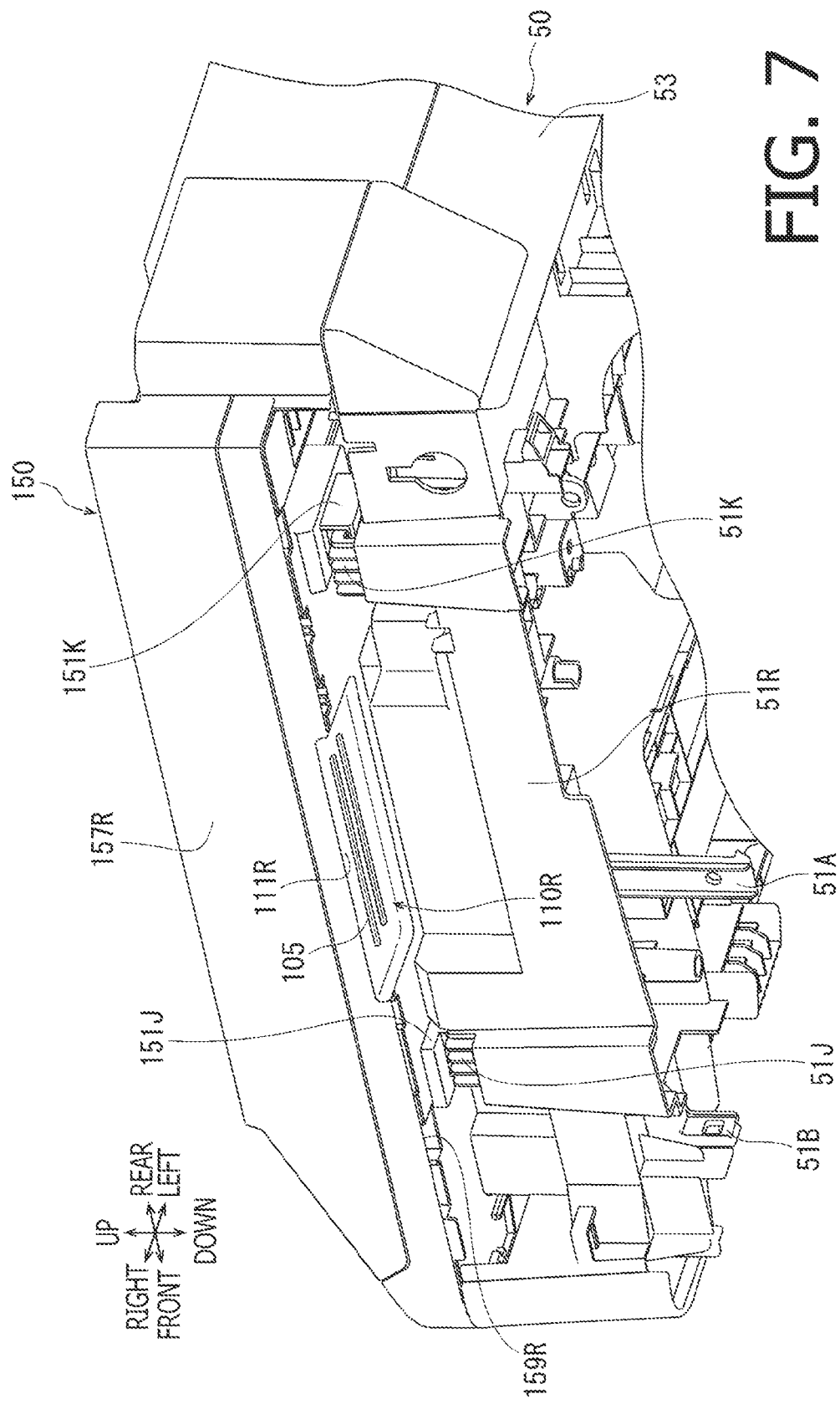
FIG. 7 is a partially enlarged perspective view showing a joint cover and a main body of a scanning unit.
Figure 8:
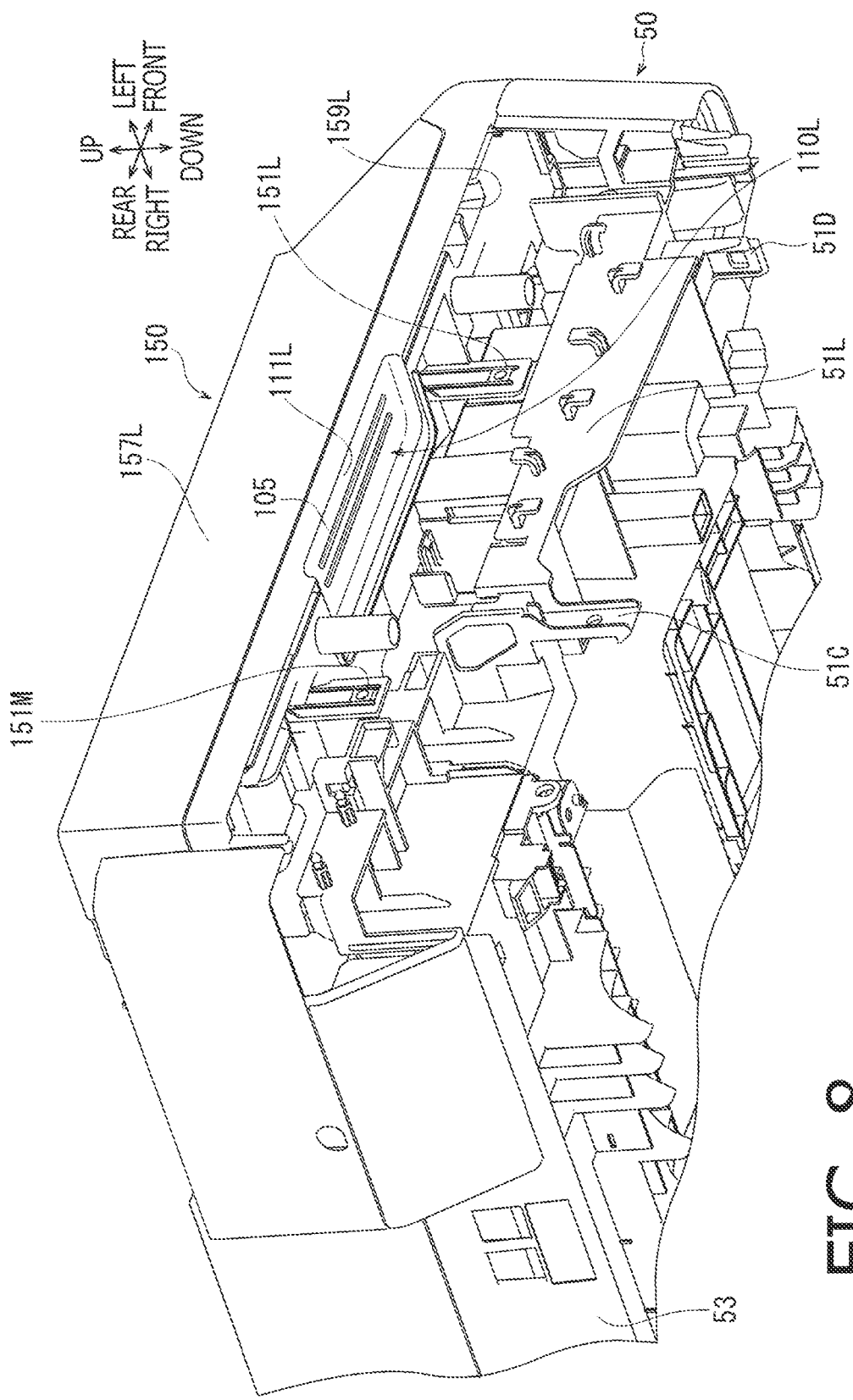
FIG. 8 is a partially enlarged perspective view showing the joint cover and the main body of the scanning unit.

As shown in FIG. 5, the front surfaces of the joint units 51R and 51L are exposed to outside on the front side of the MFD 1 and form a part of the front wall of the MFD 1. As shown in FIGS. 7 and 8, the rear surface of the connection unit 53 is exposed outside on the rear side of the MFD 1 and for a part of a rear wall of the MFD 1.

As shown in FIG. 7, on the lower surface of the right side joint unit 51R, engaging members 51A and 51B which protrude downward are integrally formed. On the lower ends of the engaging members 51A and 51B, engaging hole and/or engaging claw are formed, respectively. As shown in FIG. 8, on the lower surface of the left side joint unit 51L, engaging members 51C and 51D which protrude downward are integrally formed. On the lower ends of the engaging members 51C and 51D, engaging hole and/or engaging claw are formed, respectively.

As shown in FIG. 4, as the joint cover 50 is assembled to the main frame 40 from the above, the engaging members 51A, 51B, 51C and 51D of the joint cover 50 engage with engagement portions formed on the main frame 40, respectively. As above, the joint cover 50 is rigidly secured to the main frame 40. Although not shown, the engaging members 51A, 51B, 51C and 51D are secured to the engagement portions of the main frame with screws, respectively.

As shown in FIG. 6, on the upper surface of the right side joint unit 50R, a circular recess 51E is formed on the front side, and a square recess 51F is formed on the rear side. Similarly, on the upper surface of the left joint unit 51L, a circular recess 51G is formed on the front side, and a square recess 51H is formed on the rear side.

On the upper surface of the right joint unit 51R, on the right side of the circular recess 51E and the square recess 51F, engagement parts 51J and 51K, each of which protrudes upward by a small amount and is bent to left so that an L-shape is formed, are integrally formed.

Figure 9:
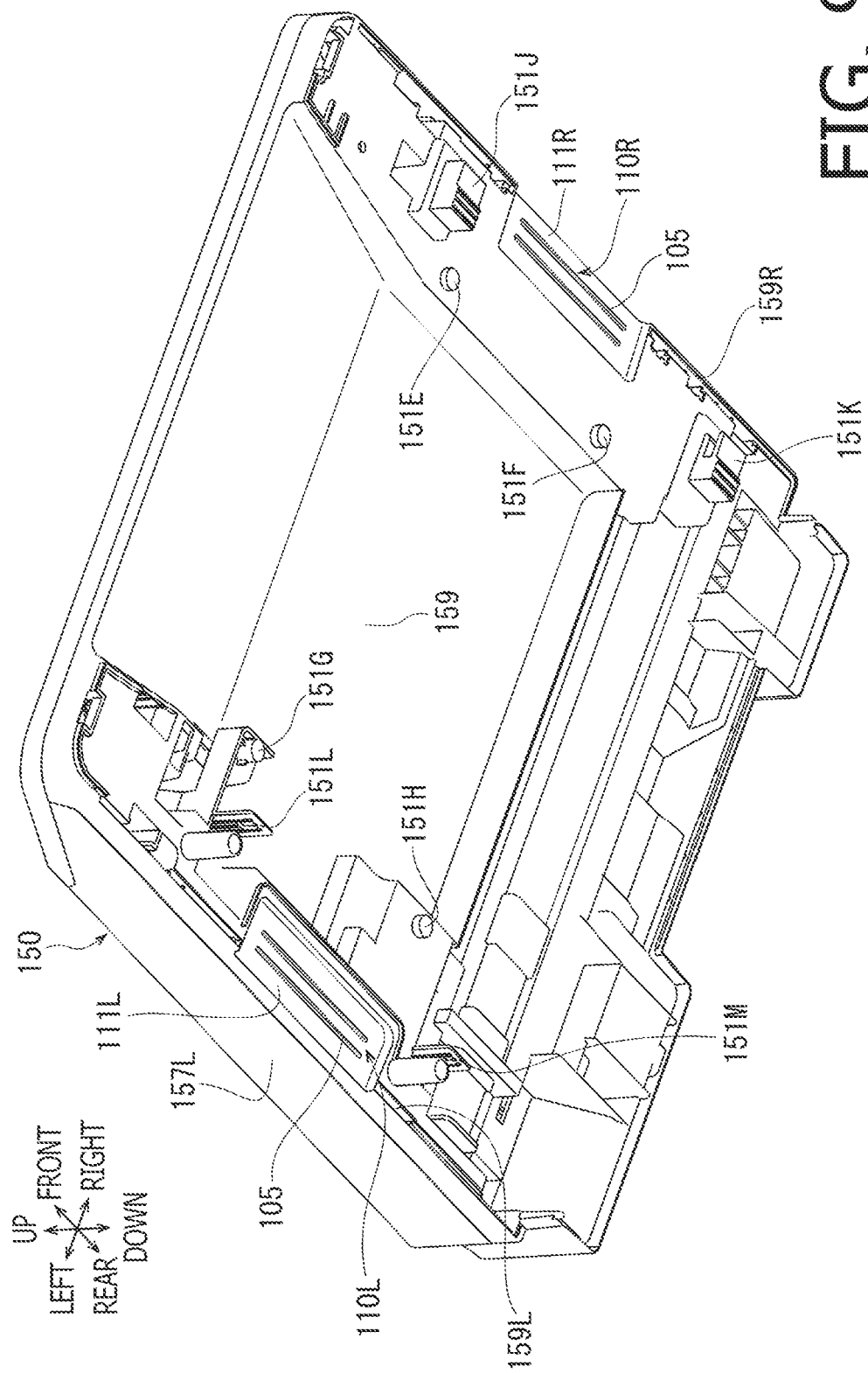
FIG. 9 is a perspective view of the main body of the scanning unit according to aspects of the invention.

As shown in FIG. 9, on the lower surface of the scanner main unit 150, a discharge space upper wall 159, which is recessed upward to form an upper surface of the discharge space 90, is formed. On the lower surface of the scanner main unit 150, protruded parts 151E and 151F, which have cylindrical shapes and protrude downward, are integrally formed at front and rear positions on the right side of the discharge space upper wall 159. Similarly, on the lower surface of the scanner main unit 150, protruded parts 151G and 151H, which have cylindrical shapes and protrude downward, are integrally formed at front and rear positions on the left side of the discharge space upper wall 150.

On the lower surface of the scanner main body 150, at front and rear positions on the right side of the protruded members 151E and 151F, engaging parts 151J and 151K, each of which protrudes downward by a small amount and is bent rightward to form an L-shape, are integrally formed.

On the lower surface of the scanner main body 150, at front and rear positions on the left side of the protruded members 151G and 151H, engaging parts 151L and 151M, each of which protrudes downward, are integrally formed. At lower ends of the engaging parts 151L and 151M, engaging claws are provided.

By moving the scanner main body 150 at a position where it is obliquely shifted in an upper left direction with respect to the joint cover 50 is moved rightward and downward, the right side engaging parts 151J and 151K engage with engagement parts 51J and 51K provided on the right side of the joint cover 50, respectively, as shown in FIG. 7. At this stage, the left side engaging parts 151L and 151M of the scanner main body 50 engage with engagement parts (not shown) provided on the left side of the joint cover 50.

Further, at this stage, the protruded members 151E, 151F, 151G and 151H of the scanner main body 50 are inserted in the circular recesses 51E, 51G, 51H and the square recess 51F of the joint cover 50, respectively. As the cylindrical protruded parts 151E, 151G and 151H are fitted in the circular recesses 51E, 51G and 51H, respectively, the scanner main body 150 is accurately positioned with respect to the joint cover 50.

As described above, the scanner main body 150 is rigidly secured to the joint cover 50. The engaging parts 151L and 151M of the scanner main body 150 and the engagement parts of the joint cover 50 are engaged by screws (not shown), respectively, to prevent them from being disengaged.

As shown in FIG. 4, side frames 41R and 41L of the main frame 40, the joint units 51R and 51L of the joint cover 50 form a pair of facing portions. The pair of facing portions extends in up-and-down direction to the lower end 1B of the MFD 1, and sandwich the image forming unit 20 in the horizontal direction. The discharge space 90 is also defined between the facing portions.

As shown in FIGS. 1 and 2, the right side wall 157R of the scanner main body 150 forms the right side wall of the image scanning device 100. The left side wall 157L of the scanner main body 150 forms the left wall of the image scanner device 100. The right and left lower ends 159R and 159L of the scanner main body 150 form the lower ends of the image scanning device 100.

As shown in FIGS. 4 and 5, the side covers 80R and 80L are panel members made of resin. The right side cover 80R is attached to the outside of the right side frame 41R and forms a right side wall of the housing 10. The left side cover 80L is attached on the outside of the left side frame 41L and forms a left side wall of the housing 10.

In FIG. 5, the MFD 1 is shown such that the joint cover 50 is spaced from the main frame 40, while the side covers 80R and 80L are coupled to the side frames 41R and 41L, respectively. When the MFD 1 is actually assembled, the side covers 80R and 80L are lastly attached to the side frames 41R and 41L after the main frame 40, the joint cover 50 and the image scanning unit 10 are assembled. It is noted that the side covers 80R and 80L are attached side frames 41R and 41L with a well-known method (e.g., by engagement, by fastening screws, etc.)

As shown in FIGS. 1 and 4, a right wall 157R of the scanner main unit 150 and the right side cover 80R form a continuous surface P1R extending in the up-and-down direction. Similarly, as shown in FIGS. 2 and 4, a left wall 157L of the scanner main unit 150 and the left side cover 80L form a continuous surface P1L extending in the up-and-down direction.

It is noted that a description "the planes P1R and P1L extend in the up-and-down direction" is intended that the "up-and-down direction" needs not be limited to a vertical direction but can be curved or inclined with respect to the vertical direction. Further, the term "continuous" is intended that the planes need not be limited to a smooth surface over the entire area of the continuous surfaces P1R and P1L, but can be planes having substantially smooth surfaces. For example, the continuous surfaces P1R and P1L could be bent slightly as shown in FIG. 4. Further, the continuous surfaces P1R and P1L may be formed with some protruded/recessed portions and/or grooves.

As shown in FIG. 4, the continuous surfaces P1R and P1L are inclined such that they approach the side frames 41R and 41L at the lower end 1B side of the MFD 1, and spaced from the joint units 51R and 51L of the joint cover 50 on the image scanner unit 100 side.

First Handy-Grip Recess

As shown in FIGS. 1, 2 and 4, according to the MFD 1, first handy-grip recesses 110R and 110L are formed on the side walls 157R and 157L of the scanner main unit 150, respectively. The first handy-grip recesses 110R and 110L face the lower end sides 159R and 159L of the scanner main unit 150. Further, as shown in FIG. 9, the first handy-grip recesses 110R and 110L are recessed upward from the lower end sides 159R and 159L, respectively, to define a vacant space having a shape of a rectangular parallelepiped flattened in the up-and-down direction.

As shown in FIGS. 4 and 9, horizontal faces slightly recessed upward at the first handy-grip recesses 110R and 110L are first handy-grip faces 111R and 111L, respectively. The first handy-grip faces 111R and 111L extend from the continuous surfaces P1R and P1L toward the inside of the image scanner unit 100. The first handy-grip faces 111R and 111L are formed to be directed downward so that a user can grip the same easily. As shown in FIG. 9, on each of the first handy-grip faces 111R and 111L, a plurality of lines of nonslip ribs 105 extending in the front-and-rear direction are formed.

As shown in FIG. 4, the first handy-grip recesses 110R and 110L are formed making use of spaces S1R and S1L at which the continuous surfaces P1R and P1L are spaced from the joint units 51R and 51L of the joint cover 50, respectively. As the first handy-grip recesses 110R and 110L are recessed upward from the lower side ends 159R and 159L of the scanner main unit 150, the first handy-grip recesses 110R and 110L are spaced upward with respect to the side covers 80R and 80L, respectively, and thus do not contact the same.

As shown in FIGS. 4 and 5, the side covers 80R and 80L have recesses 81R and 81L which face the first handy-grip recesses 110R and 110L from below, respectively. The recesses 81R and 81L are recessed from the continuous surfaces P1R and P1L toward the inside of the housing 10, thereby forming spaces each having a shape of a rectangular parallelepiped below the first handy-grip recesses 110R and 110L, respectively.

As shown in FIG. 3, a length L1 of the first handy-grip faces 111R and 111L in a direction extending horizontally along the continuous surfaces P1R and P1L (i.e., the length in the front-and-rear direction) and a length L2 of the recesses 81R and 81L in the front-and-rear direction are the same.

Exchangeable Large Scanning Unit

Figure 10:
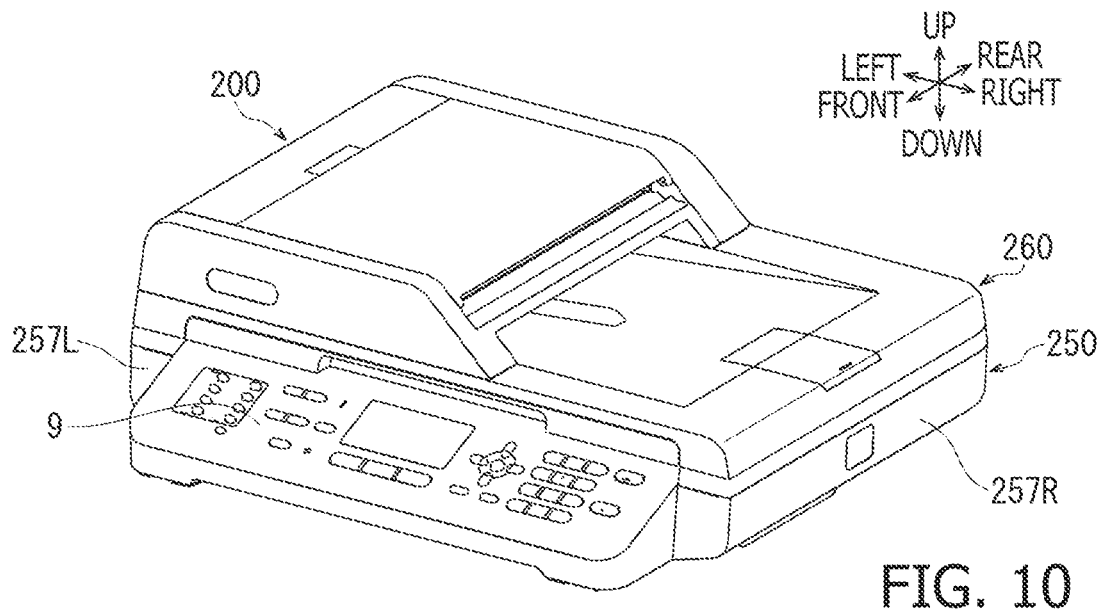
FIG. 10 is a perspective view of a large image scanning unit according to aspects of the invention.

The MFD 1 according to the embodiment is configured such that the image scanning unit 100 can be exchanged to a large scanning unit 200 (see FIGS. 10 ? 12). As described above the image scanning unit 100 has the platen glass of which the size corresponds to the A4 size (210 mm×297 mm) sheet. The large scanning unit 200 has a platen glass of which size corresponds to a legal size (215.9 mm×355.6 mm) sheet. Therefore, the large scanning unit 200 is larger than the image scanning unit 100 in its width direction (i.e., in the right-and-left direction).

The large scanning unit 200 is provided with a scanner main unit 250 and an openable/closable unit 260 provided above the scanner main unit 250. The scanner main unit 250 is configured to be larger than the scanner main unit 150 of the image scanning unit 100 in the width direction (i.e., the front-and-rear direction). The openable/closable unit 260 is also configured to be larger than the openable/closable unit 160 of the image scanning unit 100 in the width direction. The configuration of the large scanning unit 200 other than the scanner main unit 250 and the openable/closable unit 260 is the same as the configuration of the scanner main unit 150 and the openable/closable unit 160 and description thereof will be omitted for brevity.

Figure 13:
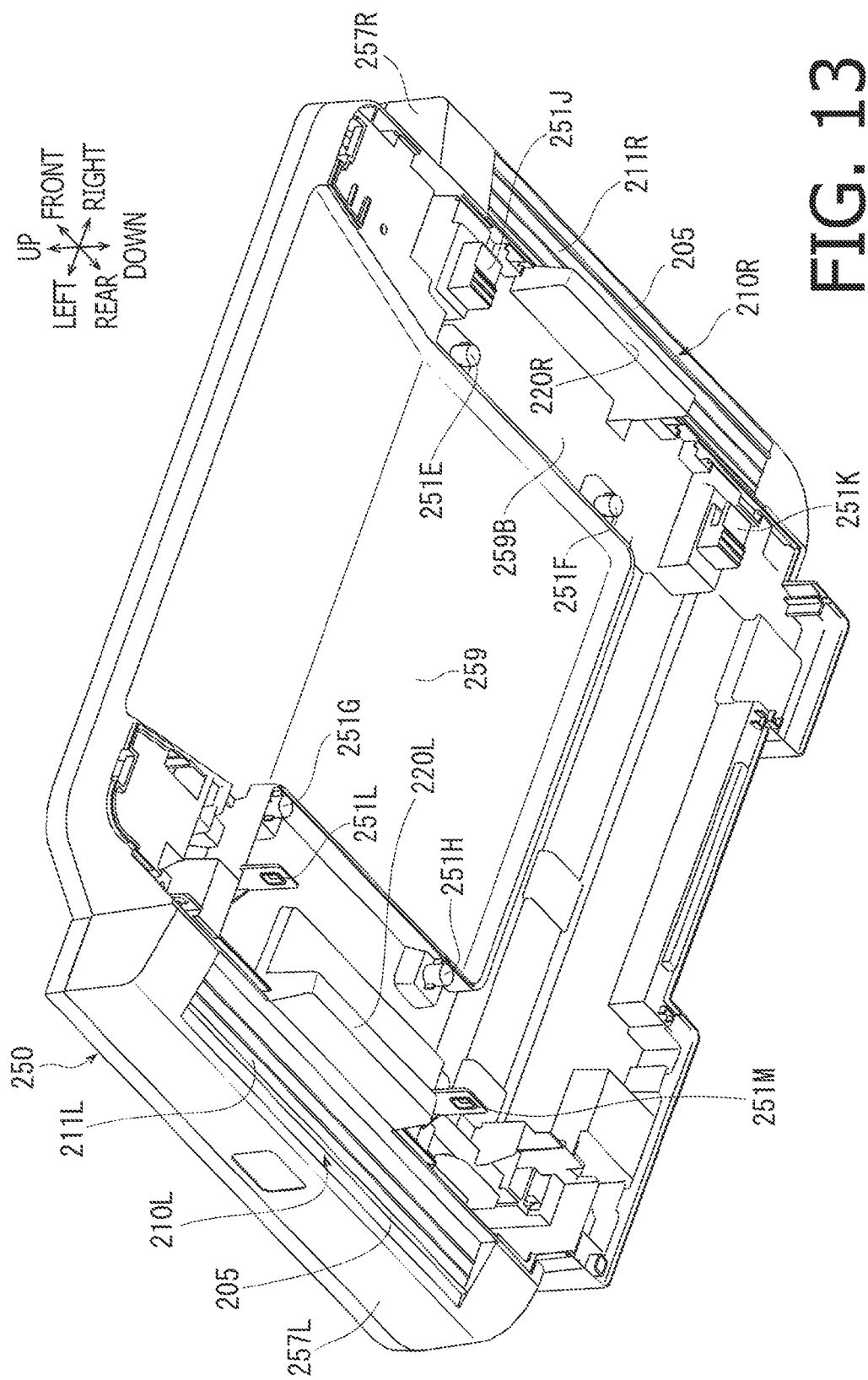
FIG. 13 is a perspective view of the large image scanning unit according to aspects of the invention.

As shown in FIG. 13, on the lower surface of the scanner main unit 250, a discharge space upper wall 250, protrusions 251E, 251F, 251G and 251H, and engagement parts 251J, 251K, 251L and 251M are formed. The shape and relative positions thereof are similar to the protrusions 151E, 151F, 151G and 151H, and engagement parts 151J, 151K, 151L and 151M of the scanner main unit 100 of the image scanning unit 100. With the above configuration, the large scanning unit 200 can be rigidly secured to the joint cover 50 by assembling the same as is done when the image scanner unit 100.

As shown in FIGS. 10 ? 12, the scanner main unit 250 has protruded parts 257R and 257L, which are protruded outward in the width direction, with respect to the side covers 80R and 80L, respectively. On the lower surfaces of the protruded portions 257R and 257L, second handy-grip recesses 210R and 210L are formed.

As shown in FIG. 13, the second handy-grip recesses 210R and 210L are respectively provided with second handy-grip faces 211R and 211L, which faces downward so that the user can grip the same. On each of the second handy-grip faces 211R and 211L, a plurality of lines of nonslip ribs 205 extending in the front-and-rear direction are formed.

Figure 12:
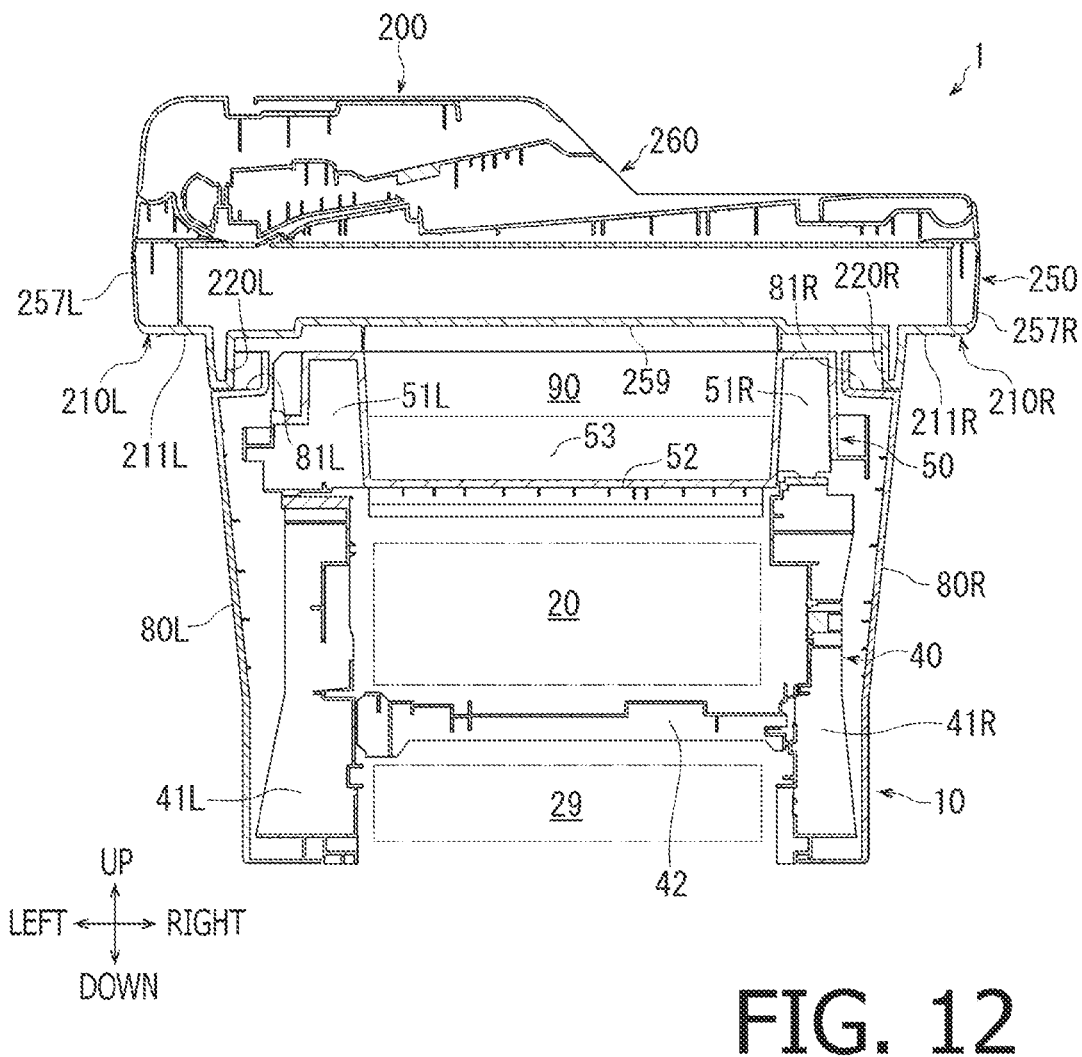
FIG. 12 is a schematic cross-sectional view, similar to FIG. 4, when the large image scanning unit is secured to the man body.

As shown in FIGS. 12 and 13, on a lower surface 259B of the scanner main unit 250, rising parts 220R and 220L are formed to rise downward. The rising parts 220R and 220L are arranged to face the upper ends of the side covers 80R and 80L from the above, respectively. According to the exemplary embodiment, the rising parts 220R and 220L are thick planar plates rising downward and extending in the front-and-rear direction.

Figure 11:
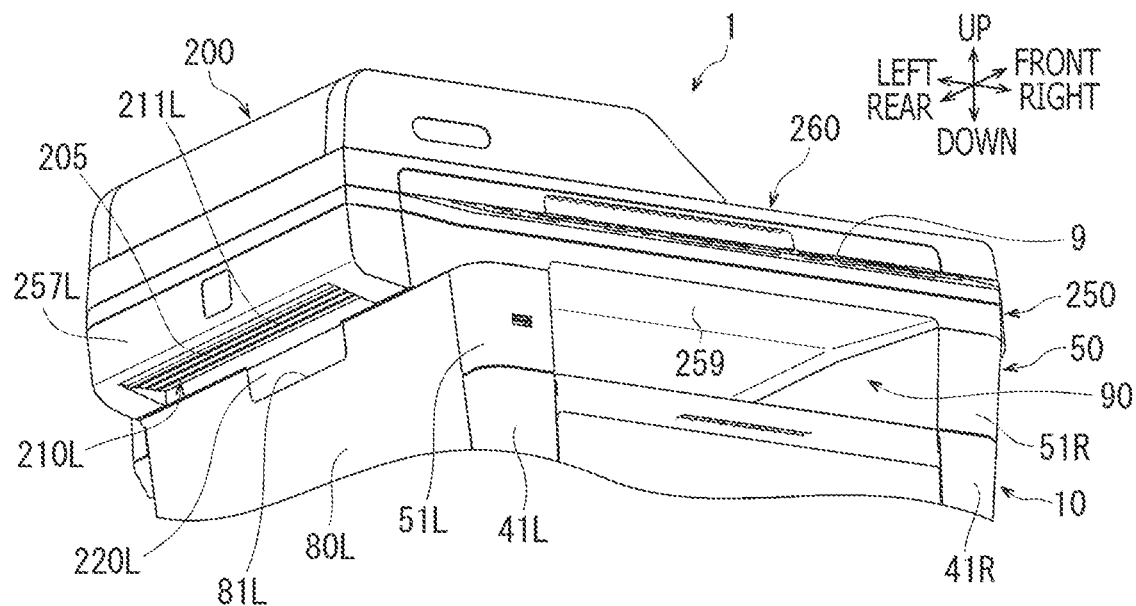
FIG. 11 is a perspective view showing a case where the large image scanning unit is secured to the main body instead of the image forming unit.

As shown in FIGS. 11 and 12, as the scanner main unit 250 is secured to the joint cover 50, the rising parts 220R and 220L are inserted in the recesses 81R and 81L of the side covers 80R and 80L to close the recesses 81R and 81L, respectively. As a result, faces of the rising parts 220R and 220L facing outward in the right-and-left direction are arranged on substantially a same plane of the outer surfaces of the side covers 80R and 80L to form right and left walls of the MFD 1, respectively.

In the MFD 1 according to the embodiment, the handy-grip recesses are not provided to the side covers 80R or 80L, but the first handy-grip recesses 110R and 110L are formed on the walls 157R and 157L of the scanner main unit 150. With this structure, the user can lift the device by gripping the first handy-grip faces 111R and 111L when the user picks up the MFD 1 from a packaging cardboard box, when the user moves the MFD 1, or the like. In this case, the weight of the image scanning unit 100 is directly loaded to the first handy-grip recesses 110R and 110L. Further, since the image scanning unit 100 is fixed to the main frame 40 and the joint cover 50, the weight of the image forming unit 20 is indirectly loaded to the first handy-grip recesses 110R and 110L via the image scanning unit, the main frame 40 and the joint cover 40. Therefore, the weight of the image forming unit 20 and the image scanning unit 100 will be hardly loaded to the side covers 80R and 80L.

Therefore, in the MFD 1 according to the embodiment, it is possible to suppress deformation of the side covers 80R and 80L when the MFD 1 is lifted. Further, according to the above configuration, it is not necessary to make the side covers 80R and 80L have high rigidity, and thus design freedom for the side covers 80R and 80L can be increased.

Further, according to the MFD 1 described above, when it is lifted, the main frame 40 and joint cover 40 supporting the image forming unit 20 are hung from the image scanning unit 100. Thus, the main frame 40 and the joint cover 50 do not need to support the weight of the image scanning unit 100. Therefore, according to the MFD 1, deformation of the main frame 40 and the joint cover 50 can be suppressed in comparison with a case where, as in a conventional configuration, the frame supports the weight of the image forming unit and the image scanning unit when the MDF is lifted.

Further, according to the MFD 1 described above, since the first handy-grip faces 111R and 111L are formed to extend inward from the continuous surfaces P1R and P1L, and the first handy-grip portions (i.e., handy-grip recesses 110R and 110L) are not protruded from the continuous panes P1R and P1L in the width direction, it is possible to make the width of the MFD 1 narrower.

In the MFD 1 according to the embodiment, the first handy-grip recesses 110R and 110L face the lower ends 159R and 159L of the scanner main unit 150, respectively. Further, the side covers 80R and 80L have recesses 81R and 81L which are recessed inwardly from the continuous surfaces P1R and P1L toward the inside of the housing 10 and face the first handy-grip recesses 110R and 110L, respectively. With this configuration, as the recesses 81R and 81L face the first handy-grip recesses 110R and 110L, sufficiently large spaces for gripping the first handy-grip faces 111R and 111L can be provided.

According to the MFD 1, as shown in FIG. 3, the length L1 of the first handy-grip faces 111R and 111L in the front-and-rear direction and the length L2 of the recesses 81R and 81L in the front-and-rear direction are identical. With this configuration, the recesses 81R and 81L will not be made too large, and sufficiently wide space for gripping the first handy-grip faces 111R and 111L can be provided.

The MFD 1 has configured that the image scanning unit 100 can be exchanged to the large scanning unit 200, which has a wider with than the image scanning unit 100 and secured to the main frame 40 and the joint cover 50. On the lower surfaces of the protruded portions 257R and 257L of the large scanner unit 200, the second handy-grip recesses 210R and 210L are formed, and the rising parts 220R and 220L are formed on the lower surface 259B. With this configuration, for a single type of housing 10, the image scanning unit 100 for scanning A4 sheets and the large scanning unit 200 for scanning legal size sheets are selectively coupled. Even if the large scanning unit 200 is coupled to the housing 10, the second handy-grip recesses 210R and 210L serves similarly to the first handy-grip recesses 110R and 110L, it is possible to suppress deformation of the side covers 80R and 80L when the MFD 1 is lifted. Further, when the large scanning unit 200 is coupled, since the rising parts 220R and 220L cover the recesses 81R and 81L of the side covers 80R and 80L, respectively, it is unnecessary to use different side covers which are not formed with the recesses 81R and 81L. Therefore, as the number of members can be reduced by using the same members in different configurations, the manufacturing cost can be suppressed.

In the MFD 1, the first handy-grip recesses 110R and 110L are recessed from the lower ends 159R and 159L of the scanner main body 150, and relatively large spaces can be provided for gripping the first handy-grip faces 111R and 111L, respectively.

Since the first handy-grip recesses 110R and 110L do not contact the side covers 80R and 80L, respectively. Therefore, load applied to the first handy-grip recesses 110R and 110L is not transmitted to the side covers 80R and 80L, respectively, and thus, deformation of the side covers 80R and 80L can be prevented.

In the MFD 1, as the nonslip ribs 105, 205 are formed, when the user grips the first handy-grip recesses 110R and 110L or the second handy-grip recesses 210R and 210L to move the MFD 1, slipping of the users hand with respect to the first handy-grip faces 111R and 111L or the second handy-grip faces 211R and 211L can be prevented, and the user can move the MFD 1 relatively easily.

In the MFD 1 according to the embodiment, the main frame 40 and the joint cover 50 have a pair of side frames 41R and 41L, and a pair of joint units 51R and 51L, which are spaced horizontally and face each other. Between the joint units 51R and 51L, the discharge space 90 is formed. Further, the scanner main body 150 of the image scanning unit 100 is secured to the joint members 51R and 51L. With this configuration, since it is ensured that the image scanning unit 100 can be secured to the main frame 40 and the joint cover 50, and transmission of load therebetween can be performed, although the discharge space 90 is formed below the image scanning unit 100, deterioration of the rigidity of the MFD 1 can be suppressed.

According to the MFD 1, since the continuous surfaces P1R and P1L are inclined such that they are closer to the side frames 41R and 41L at the lower end 1B side of the MFD 1, while they are farther from the joint members 51R and 51L on the image scanning unit 100 side located at an upper positions, the positions of the side frames 41R and 41L configuring the frame 40 can be made closer in comparison with the width of the MFD 1. As a result, the installation area of the MFD 1, which is normally determined based on positions of the side frames 41R and 41L can be made small with respect to the appearance of the MFD 1. Further, as shown in FIG. 4, the first handy-grip recesses 110R and 110L can be provided easily at the spaces S1R and S1L at which the continuous surface P1R and P1L are spaced from the joint units 51R and 51L.

It should be noted that the above-described embodiment is an exemplary embodiment, and the invention should not be limited to the above-described configuration of the exemplary embodiment. Rather, the configuration can be modified in various ways without departing from the scope of the invention.

For example, the first handy-grip recesses may not be the upwardly recessed portions. That is, the first handy-grip faces 111R and 111L may be shifted to the lower ends 159R and 159L of the scanner main unit 150. Also in such a configuration, sufficient spaces for gripping can be provided as the recess 81R and 81L are formed to the side covers 80R and 80L, respectively. Alternatively, the first handy-recess portions may be provided by forming recessed portions each having a shape of a rectangular parallelepiped and recessed inwardly toward the continuous surfaces P1R and P1L or toward the inside of the image scanning unit 100, at an upper position spaced from the lower ends 159R and 159L of the scanner main body 150. In such a configuration, the recesses 81R and 81L of the side covers 80R and 80L will become unnecessary.

Instead of the nonslip ribs 105 and 205, various types of nonslip structures such as nonslip grooves or uneven surfaces having a plurality of protrusions and/or holes may be provided.

What is claimed is:
1. A multi-function device, comprising:
a housing;
an image forming unit accommodated in the housing and configured to form an image on a printing sheet;
an image scanning unit arranged above the housing and configured to scan an image on an original sheet, the image scanning unit having right and left side walls,
wherein the housing comprises:
a frame supporting the image forming unit, the image scanning unit being secured to the frame; and an outer cover attached to an outside of the frame to form right and left side walls of the housing,
wherein right and left continuous surfaces extending in an up-and-down direction are formed by at least part of the right and left side walls of the image scanning unit and at least part of the right and left side walls of the housing, respectively, and
wherein right and left first grip portions are formed on the right and left continuous surfaces so as to be recessed therefrom, respectively, and comprise:
right and left grip recesses, respectively, extending inwardly from lower ends of the right and left side walls of the image scanning unit to define downwardly facing right and left first grip faces extending inwardly into the image scanning unit and sidewalls extending upwardly from a lower surface of the image scanning unit; and
right and left recessed portions, respectively, extending inwardly from upper ends of the right and left side walls of the outer cover to define upwardly facing bottoms extending inwardly into the outer cover and sidewalls extending downwardly from an upper surface of the outer cover such that the right and left recessed portions face the right and left grip recesses and the right and left first grip faces,
wherein when the grip portions are gripped, a weight of the image forming unit is loaded to the first grip faces by the frame.

2. The multi-function device according to claim 1, wherein a length of the right and left first grip faces extending horizontally and along the continuous surfaces is identical to a length of the right and left recessed portions extending horizontally and along the continuous surfaces, respectively.

3. The multi-function device according to claim 1,
which is configured such that the image scanning unit is exchangeable to a large scanning unit having a larger size in a width direction than the image scanning unit, the large scanning unit being secured, above the housing, to the frame,
wherein the large scanning unit has protruded portions which protrude outward, in the width direction, with respect to the outer cover,
wherein second grip portions having second grip faces are provided on lower surfaces of the protruded portions, respectively, and
wherein right and left rising parts which rise downward toward the right and left recessed portions, respectively, are formed on the lower surface of the large scanning unit.

4. The multi-function device according to claim 3, wherein the right and left rising parts completely close the right and left recessed portions, respectively.

5. The multi-function device according to claim 1, wherein each of the right and left first grip faces is provided with a nonslip structure.

6. The multi-function device according to claim 1,
wherein the frame comprises right and left facing portions which are spaced and face each other at a lower portion of the image scanning unit,
wherein a discharge space, to which the printing sheets on which images have been formed by the image forming unit are discharged, is defined between the right and left facing portions, and
wherein the image scanning unit is secured at least to the right and left facing portions.

7. The multi-function device according to claim 6,
wherein the right and left facing portions extend to the lower end of the multi-function device and face each other horizontally sandwiching the image forming unit,
wherein the right and left continuous surfaces are inclined so as to be close to the right and left facing portions at the lower end of the multi-function device, respectively, and are spaced from the right and left facing portions on the image scanning device side, respectively, and
wherein the right and left first grip portions are formed at spaces where the right and left continuous surfaces are spaced from the right and left facing portions, respectively.

8. A multi-function device, comprising:
a frame;
an outer cover attached to an outside of the frame and having a first right side wall, a first left side wall, an outer surface, and an upper surface connecting the first right side wall with the first left side wall;
an image forming unit supported by the frame and configured to form an image on a printing sheet;
an image scanning unit arranged above the outer cover and configured to scan an image on an original sheet, the image scanning unit having a second right side wall, a second left side wall and a lower surface connecting the second right side wall with the second left side wall;
wherein:
the first right side wall and the second right side wall form a right continuous surface extending in an up-and-down direction;
the first left side wall and the second left side wall form a left continuous surface extending in an up-and-down direction;
the first right side wall further comprises a first recessed portion extending inwardly from an upper end of the first right side wall to define a bottom extending inwardly from the outer surface of the outer cover and sidewalls extending downwardly from the upper surface of the outer cover;
the second right side wall further comprises a first grip recessed portion extending inwardly from a lower end of the second right side wall to define a right top extending inwardly into the image scanning unit and sidewalls extending upwardly from the lower surface of the image scanning unit;
the first recessed portion and the first grip recessed portion form a right grip portion on the right continuous surface;
the right grip portion includes a right space defined by the first recessed portion and the first grip recessed portion;
the first left side wall further comprises a second recessed portion extending inwardly from an upper end of the first left side wall to define a bottom extending inwardly from the outer surface of the outer cover and sidewalls extending downwardly from the upper surface of the outer cover;
the second left side wall further comprises a second grip recessed portion extending inwardly from a lower end of the second left side wall to define a left top extending inwardly into the image scanning unit and sidewalls extending upwardly from the lower surface of the image scanning unit;
the second recessed portion and the second grip recessed portion form a left grip portion on the left continuous surface; and the left grip portion includes a left space defined by the second recessed portion and the second grip recessed portion, wherein when the right and left grip portions are gripped, a weight of the image forming unit is loaded to the right top and the left top by the frame.

* * * * *